US009348760B2

(12) United States Patent
Salessi et al.

(10) Patent No.: US 9,348,760 B2
(45) Date of Patent: *May 24, 2016

(54) SYSTEM AND METHOD FOR EFFICIENT FLASH TRANSLATION LAYER

(71) Applicant: NXGN DATA, INC., Irvine, CA (US)

(72) Inventors: Nader Salessi, Laguna Niguel, CA (US); Joao Alcantara, Irvine, CA (US)

(73) Assignee: NXGN Data, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,573

(22) Filed: Sep. 9, 2014

(65) Prior Publication Data

US 2015/0149706 A1   May 28, 2015

Related U.S. Application Data

(63) Continuation of application No. 14/092,817, filed on Nov. 27, 2013, now Pat. No. 8,838,936.

(51) Int. Cl.
  *G06F 12/00* (2006.01)
  *G06F 12/10* (2016.01)
  *G06F 12/02* (2006.01)

(52) U.S. Cl.
  CPC ........ *G06F 12/1009* (2013.01); *G06F 12/0246* (2013.01); *G06F 2212/65* (2013.01); *G06F 2212/7201* (2013.01)

(58) Field of Classification Search
  CPC ................ G06F 12/0246; G06F 2212/7201; G06F 2212/65
  See application file for complete search history.

(56) References Cited

U.S. PATENT DOCUMENTS

| 2007/0300037 | A1 | 12/2007 | Rogers et al. | |
|---|---|---|---|---|
| 2008/0168252 | A1 | 7/2008 | Kunimune et al. | |
| 2010/0174869 | A1 | 7/2010 | Gorobets et al. | |
| 2010/0332887 | A1* | 12/2010 | Lin et al. | 713/340 |
| 2011/0072199 | A1* | 3/2011 | Reiter et al. | 711/103 |

OTHER PUBLICATIONS

Y.-K. Suh, B. Moon, A. Efrat, J.-S. Kim, and S.-W. Lee, "Extent mapping scheme for flash memory devices," in Modeling, Analysis & Simulation of Computer and Telecommunication Systems (MASCOTS), 2012 IEEE 20th International Symposium on. IEEE, 2012, pp. 331-338.

Q. Wei, B. Gong, S. Pathak, B. Veeravalli, L. Zeng, and K. Okada, "WAFTL: A workload adaptive flash translation layer with data partition," Mass Storage Systems and Technologies, IEEE/NASA Goddard Conference on, vol. 0, pp. 1-12, 2011.

M. Zheng, J. Tucek, F. Qin, and M. Lillibridge. Understanding the robustness of SSDs under power fault. In Proc. of the 11th USENIX Conf. on File and Storage Technologies (FAST), San Jose, CA, Feb. 2013.

* cited by examiner

*Primary Examiner* — Gurtej Bansal
(74) *Attorney, Agent, or Firm* — Lewis Roca Rothgerber Christie LLP

(57) ABSTRACT

A method of maintaining and updating a logical-to-physical (LtoP) table in a storage device including a processor, a volatile memory, and a non-volatile memory, the storage device being in communication with a host, the method including receiving, by the processor, data for storing at a physical address in the non-volatile memory, the data being associated with a logical address of the host, storing, by the processor, the physical address in a first LtoP zone of a plurality of LtoP zones of the LtoP table, the LtoP table being stored in the volatile memory, adding, by the processor, the first LtoP zone to a list of modified zones, and storing, by the processor, a second LtoP zone of the plurality of LtoP zones in the non-volatile memory when a size of the list of modified zones exceeds a threshold.

12 Claims, 7 Drawing Sheets

SYSTEM AND METHOD FOR EFFICIENT FLASH TRANSLATION LAYER

CROSS-REFERENCE TO RELATED APPLICATION

This application is a continuation of U.S. patent application Ser. No. 14/092,817, filed on Nov. 27, 2013, now U.S. Pat. No. 8,838,936, which is related to a U.S. patent application entitled System and Method for Supporting Atomic Writes in a Flash Translation Layer U.S. patent application Ser. No. 14/092,821, filed on Nov. 27, 2013, the entire contents of both of which are incorporated herein by reference.

FIELD

The following description relates to non-volatile storage systems and more particularly to a system and method for achieving an efficient flash translation layer in a solid-state drive.

BACKGROUND

Every day, several quintillion bytes of data may be created around the world. This data comes from everywhere: posts to social media sites, digital pictures and videos, purchase transaction records, bank transactions, sensors used to gather data and intelligence, like climate information, cell phone GPS signal, and many others. This type of data and its vast accumulation is often referred to as "big data." This vast amount of data eventually is stored and maintained in storage nodes, such as solid-state storage drives (SSDs), and the like, and these may reside on networks or on storage accessible via the Internet. This stored data may require processing, or be subject to operations, such as search, query, encryption/decryption, compression, decompression, and/or other processes. In a server platform, for example, a processing device, such as a central processing unit (CPU), performs operations on the data. The data may be read from the SSD, processed by the CPU, and the processed data may be sent to the source of a request. However, a host or server operates based on logical addresses of the data, and is not aware of the physical location (e.g., also referred to as NAND flash physical addresses) of the data on the SSD.

A flash translation layer (FTL) provides the mapping from the host logical address to flash physical address. It is desired for this mapping to be unaffected by and remain consistent across power cycles. A typical FTL maintains this mapping information in a linear mapping table, which may be referred to as a logical-to-physical (LtoP) map table. The LtoP table has one entry per logical block, with each logic block representing the smallest contiguous piece of logical block address (LBA) that is addressed individually by the LtoP table. Size of the LtoP table is linearly proportional with SSD size, and, for example, may be several gigabytes for a large SSD (e.g., an SSD that is several terabytes in size). It is desired for an FTL algorithm to be capable of rebuilding the translation table in a short amount of time during system power on. The power on time is system dependent but is typically in order of few seconds (such as 2 to 4 seconds). If the FTL algorithm is not able to rebuild the translation table in that amount of time, the host may not be able to detect the SSD during the boot-up process.

Current solutions have various shortcomings. One current solution is to write the entire LtoP table to non-volatile memory (e.g., flash memory) upon power fail and read it back at power on. While this may be a simple answer to the problem, it requires incorporating an array of capacitor banks (e.g. super capacitor banks) in the system. However, super capacitor banks add additional cost and complexity to the SSD and the charge capacity of the super capacitors degrades over time, which may lead to reliability issues and recovery failures.

Thus, there is a need for a system and method for a more efficient flash translation layer operating in the SSD, particularly during a drive power cycle.

SUMMARY

Aspects of embodiments of the present invention are directed to a system and method of achieving an efficient flash translation layer in a solid state drive (SSD).

Aspects of embodiments of the present invention are directed to preserving the integrity of data stored on an SSD in the event of a power cycle by backing up part of the logical-to-physical (LtoP) map table prior to loss of power and quickly reconstructing the L2P table at the power on stage.

According to an embodiment of the present invention there is provided a method of maintaining and updating a logical-to-physical (LtoP) table in a storage device including a processor, a volatile memory, and a non-volatile memory, the storage device being in communication with a host, the method including: receiving, by the processor, data for storing at a physical address in the non-volatile memory, the data being associated with a logical address of the host; storing, by the processor, the physical address in a first LtoP zone of a plurality of LtoP zones of the LtoP table, the LtoP table being stored in the volatile memory; adding, by the processor, the first LtoP zone to a list of modified zones; and storing, by the processor, a second LtoP zone of the plurality of LtoP zones in the non-volatile memory when a size of the list of modified zones exceeds a threshold.

In one embodiment, the at least one physical address is stored in each LtoP zone of the plurality of LtoP zones.

In one embodiment, the method further includes, after the receiving of the data, storing, by the processor, the data at a physical address in the non-volatile memory.

In one embodiment, the method further includes, after the adding of the first LtoP zone to the list of modified zones, identifying, by the processor, another LtoP zone of the plurality of LtoP zones added earlier than the first LtoP zone of the plurality of LtoP zones to the list of modified zones as the second LtoP zone.

In one embodiment, the method further includes identifying, by the processor, another LtoP zone of the plurality of LtoP zones added earlier than all other zones of the plurality of LtoP zones to the list of modified zones as the second LtoP zone.

In one embodiment, the method further includes: after the storing of the second LtoP zone, removing the second LtoP zone from the list of modified zones, wherein the second zone was earlier added to the list of modified zones.

In one embodiment, the storing of the second LtoP zone in the non-volatile memory includes storing the second LtoP zone in a data structure including a zone number and a zone information.

In one embodiment, the size of the list of modified zones is equal to a number of LtoP zones of the plurality of LtoP zones added to the list of modified zones.

In one embodiment, the threshold is determined based on an amount of energy stored in a capacitor bank of the storage device and a write speed of the storage device.

In one embodiment, zones of the plurality of LtoP zones are contiguous and sequential.

In one embodiment, each LtoP zone of the plurality of LtoP zones is 4 KB in size.

According to an embodiment of the present invention there is provided a method of re-building, during a power on stage, a logical-to-physical (LtoP) table in a storage device including a processor, a volatile memory, and a non-volatile memory, the storage device being in communication with a host, the method including: retrieving and subsequently processing, by the processor, a plurality of flushed zone segments stored in the non-volatile memory in an order opposite to an order of storage of the plurality of flushed zone segments in the non-volatile memory, wherein the processing of the plurality of flushed zone segments includes: identifying a retrieved flushed zone segment of the plurality of flushed zone segments differing from all previously retrieved plurality of flushed zone segments; and writing the identified retrieved flushed zone segment of the plurality of flushed zone segments to the LtoP table in the volatile memory.

In one embodiment, each of the plurality of flushed zone segments includes a zone number and a zone information.

In one embodiment, identifying a retrieved flushed zone segment of the plurality of flushed zone segments includes identifying a retrieved flushed zone segment of the plurality of flushed zone segments having a retrieved zone number differing from zone numbers of all previously retrieved plurality of flushed zone segments.

In one embodiment, the writing of the identified retrieved plurality of flushed zone segments to the LtoP table includes writing the zone information of the identified retrieved flushed zone segments of the plurality of flushed zone segments to an offset location of the LtoP table.

In one embodiment, the offset location of the LtoP table is equal to a size of an LtoP zone associated with the plurality of flushed zone segments multiplied by the zone number of the identified retrieved flushed zone segment of the plurality of flushed zone segments, wherein a zone number of one of the plurality of flushed zones is zero.

According to an embodiment of the present invention there is provided a storage device configured to maintain and update a logical-to-physical (LtoP) table resilient to power cycles, and in communication with a host, the storage device including: a processor; and a memory including a volatile memory and a non-volatile memory, wherein the memory has stored thereon instructions that, when executed by the processor, cause the processor to perform: receiving data for storing at a physical address in the non-volatile memory, the data being associated with a logical address of the host; storing the physical address in a first LtoP zone of a plurality of LtoP zones of the LtoP table, the LtoP table being stored in the volatile memory; adding the first LtoP zone to a list of modified zones; and storing a second LtoP zone of the plurality of LtoP zones in the non-volatile memory when a size of the list of modified zones exceeds a threshold.

In one embodiment, at least one physical address is stored in each LtoP zone of the plurality of LtoP zones.

In one embodiment, the executed instructions further cause the processor to perform: identifying, by the processor, another LtoP zone of the plurality of LtoP zones added earlier than all other zones of the plurality of LtoP zones to the list of modified zones as the second LtoP zone.

In one embodiment, the executed instructions further cause the processor to perform: after the storing of the second LtoP zone, removing the second LtoP zone from the list of modified zones, wherein the second zone was earlier added to the list of modified zones.

In one embodiment, the storing of the second LtoP zone in the non-volatile memory includes storing the second LtoP zone in a data structure including a zone number and a zone information.

According to an embodiment of the present invention there is provided a storage device configured to rebuild a logical-to-physical (LtoP) table during a power on stage, the storage device including: a processor; and a memory including a volatile memory and a non-volatile memory, wherein the memory has stored thereon instructions that, when executed by the processor, cause the processor to perform: retrieving and subsequently processing a plurality of flushed zone segments stored in the non-volatile memory in an order opposite to an order of storage of the plurality of flushed zone segments in the non-volatile memory, wherein the processing includes: identifying a retrieved flushed zone segment of the plurality of flushed zone segments that is different from all previously retrieved plurality of flushed zone segments; and writing the identified retrieved flushed zone segment of the plurality of flushed zone segments to the LtoP table in the volatile memory.

In one embodiment, each of the plurality of flushed zone segments includes a zone number and a zone information.

In one embodiment, wherein identifying a retrieved flushed zone segment of the plurality of flushed zone segments includes: identifying a retrieved flushed zone segment of the plurality of flushed zone segments having a retrieved zone number differing from zone numbers of all previously retrieved plurality of flushed zone segments.

In one embodiment, the writing of the identified retrieved plurality of flushed zone segments to the LtoP table includes writing the zone information of the identified retrieved flushed zone segments of the plurality of flushed zone segments to an offset location of the LtoP table.

In one embodiment, the offset location of the LtoP table is equal to a size of an LtoP zone associated with the plurality of flushed zone segments multiplied by the zone number of the identified retrieved flushed zone segment of the plurality of flushed zone segments, wherein a zone number of one of the plurality of flushed zones is zero.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be illustrative only.

DETAILED DESCRIPTION

The detailed description set forth below in connection with the appended drawings is intended as a description of illustrative embodiments of a system and method for an efficient flash translation layer in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

The present invention relates to systems and methods for an efficient flash translation layer (FTL) and an improved solid-state storage drive (SSD) power on. The FTL may maintain this information in a linear mapping table, also referred to as a logical-to-physical (LtoP) map table. In order to preserve data integrity, it is desirable for the LtoP table to be unaffected by power outages or power cycles. Further, it is desired that the FTL algorithm be capable of rebuilding the translation table in a short amount of time during system power on.

Figure 1:
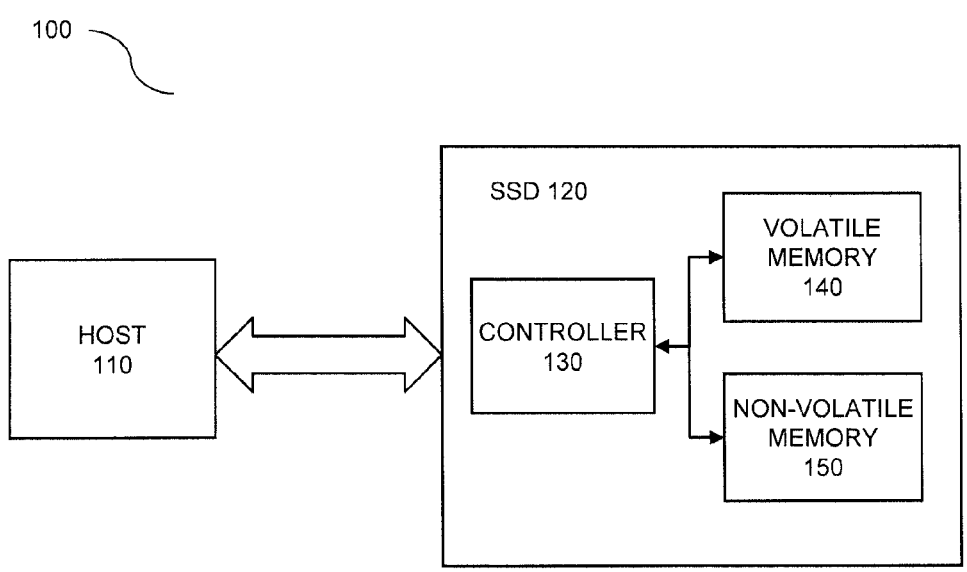
FIG. 1 is a block diagram of a system that includes a host in communication with a storage node for performing data queries, according to an embodiment of the present invention.

FIG. 1 is a block diagram of a system 100, which includes a host 110 (e.g., a server host) in communication with a storage node (e.g., SSD 120) for performing data queries, according to an embodiment of the present invention.

In some embodiments, the host 110 and the SSD 120 may be implemented in a cloud-based computing environment. The host 110 and the SSD 120 may communicate using any storage buses as well as PCIe with any protocol that runs on it. In other embodiments, SSDs may be connected to, and controlled by, a host central processing unit (CPU), which need not be a server CPU but may be a CPU in an application not configured as a server. Thus a server CPU may be an example of a host CPU.

As used herein, the phrase "in communication with" refers to direct communication with, or in indirect communication with, via one or more components named or unnamed herein. The host 110 and the SSD 120 can be in communication with each other via a wired or wireless connection. For example, in one embodiment, the SSD 120 may include pins (or a socket) to mate with a corresponding socket (or pins) on the host 110 to establish an electrical and physical connection. In another embodiment, the SSD 120 can include a wireless transceiver to place the host 110 and the SSD 120 in wireless communication with each other. The host 110 and the SSD 120 may be separately housed from each other, or contained in the same housing. The host 110 and the SSD 120 may include additional components, which are not shown in FIG. 1 to simplify the drawing.

The host 110 includes a processing device, such as a CPU, which performs operations on the data. The data may be written to the SSD 120 or may be read from the SSD 120, processed by the CPU, and the processed data may be sent to the source of a request. The host 110 operates based on logical addresses of the data, and may be unaware of the physical locations (e.g., also referred to as NAND flash physical addresses) of the data stored on the SSD 120.

According to an embodiment of the present invention, the SSD 120 may include a controller 130, a volatile memory 140 (e.g., dynamic random access memory (DRAM)), and a non-volatile memory 150 (e.g., flash memory). The controller 130 facilitates the transfer of data to and from the SSD 120 and includes a flash translation layer, which may be a software layer acting as a translation layer between the sector-based file system of the host 110 and the flash memory devices (e.g., the NAND flash chips) of the SSD 120. The FTL provides the operating system and the file system on the host side, access to the flash memory devices as access disk drives. In so doing, the FTL hides the complexity of flash by providing a logical block interface to the flash device by mapping the host's logical addresses to the flash memory's (e.g., NAND flash memory's) physical addresses in the LtoP table. The LtoP table may be stored in the volatile memory 140, and the data to and/or from the host 110 may be stored in the non-volatile memory 150.

According to an embodiment, the LtoP table is divided into a plurality of zones, each zone having one or more entries. The LtoP table has one entry per logical block, with each logic block representing the smallest contiguous piece of logical block addresses (LBAs) that is addressed individually by the LtoP table.

In many applications, for example, big data applications, there may not be any pure random writes (e.g., random writes of blocks of data being 4 KB in size) to the SSD 120. Therefore, in many applications (particularly big data applications) a limited number of zones in LBA range will be involved in host writes. Here, both the contiguous nature of the data to be written to the SSD 120 and the limited number of LtoP zones that may be affected allow for an FTL algorithm that does not suffer from long power on to ready time.

Figure 2A:
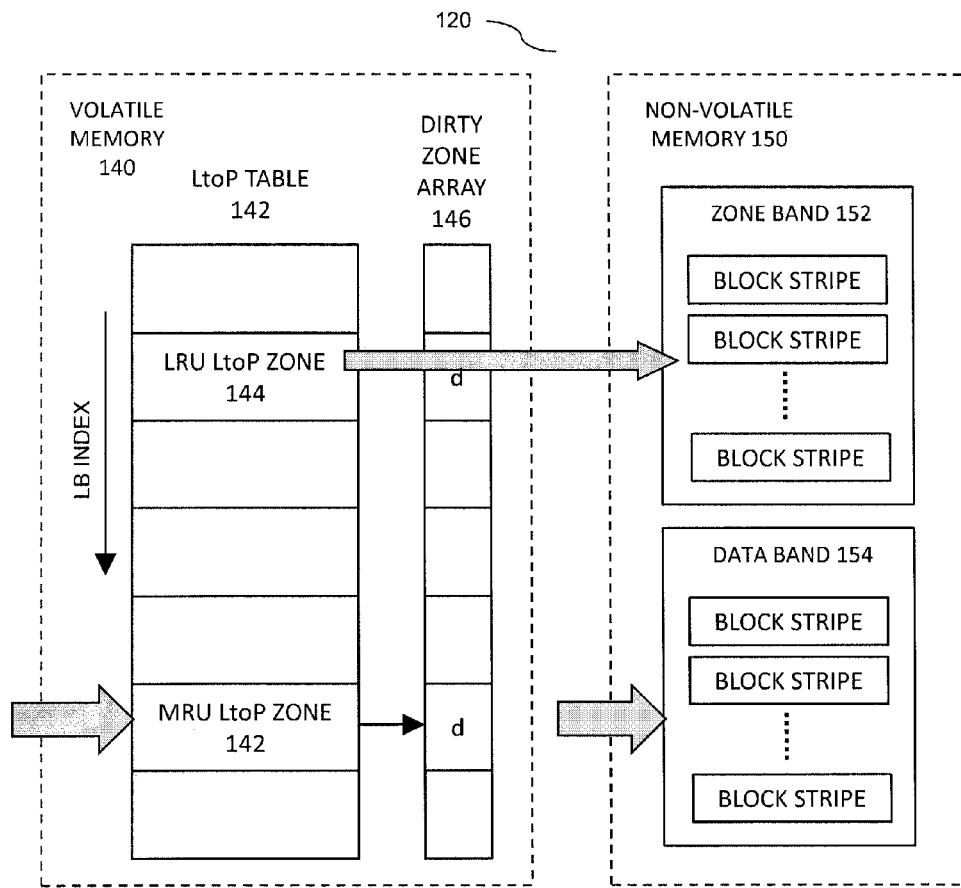
FIG. 2A illustrates a representation of an logical-to-physical (LtoP) table of a volatile memory divided into fixed-size zones and a non-volatile memory divided into separate block stripes grouped as zone band and data band, in relation with write processes conducted on the storage node, in accordance with an illustrative embodiment of the present invention.

FIG. 2A illustrates a representation of an LtoP table 142 of a volatile memory 140 divided into fixed-size zones and a non-volatile memory 150 (e.g., flash memory) divided into separate block stripes grouped as zone band 152 and data band 154, in relation with write processes conducted on the SSD 120, in accordance with an illustrative embodiment of the present invention.

According to an embodiment of the present invention, the LtoP table may be located in volatile memory 140 (e.g., DRAM) and backed up on the non-volatile memory (e.g., flash memory) by writing the whole map to non-volatile memory 150 on first power on (i.e. during manufacturing). When an SSD 120 receives data to write onto the non-volatile memory 150, the controller 130 writes the data to physical addresses in the data band 154 of the non-volatile memory 150 (e.g., flash) and indexes (e.g., sequentially indexes) the physical addresses in the zones of the LtoP table 142. In an embodiment, the LtoP zones may be equal to or greater in size than the host logical block. For example, for logical blocks that may be 512 B, 1 KB, 2 KB, or 4 KB in size, each zone may also occupy 4 KB of space on the DRAM.

In an embodiment of the present invention, when an entry in an LtoP zone is modified due to a logical block write, the whole zone is labeled as dirty (e.g., marked as modified). The dirty label indicates that the zone (and the physical addresses included therein) may need to be flushed (e.g., backed up) to flash memory, for example, in the zone band 152 of the non-volatile memory 150. The controller 130 may keep track of dirty zones by, for example, using a dirty zone array 146 (e.g., dirty zone bitmap) having a number of elements matching the number of zones in the LtoP table 142. For every zone that is dirtied (e.g., has a modified entry), an associated element within the array is set to a preset value (e.g., a corresponding bit in the bitmap may be set to a value of "1"). The controller 130 may also record the zone number of the most recently dirtied zone in a least recent used (LRU) list, which may be maintained in the volatile memory 140.

In one illustrative embodiment, when a number of dirty zones exceeds a threshold N (e.g., if the number of "1s" in the dirty zone array 146 exceeds a threshold N, N being a positive integer), the controller 130 flushes a preset number M (a positive integer) of dirtied zones to the zone band 152 of the non-volatile memory 150 and clears the "dirty" or "modified" label from the flushed zones, by, for example, setting the corresponding elements in the dirty zone array to "0s." The controller 130 may further clear the zones from the LRU list. The threshold N may be set according to the ability of the system to flush zones in the event of a sudden system power loss (or system power failure). For example, in the event of a sudden power loss, the energy stored in the capacitor bank may be sufficient to keep the system running for only a brief period of time (e.g., less than a second). That amount of time translates into a number of flash page writes per flash memory die and can be used to determine the threshold N of dirty zones that can be safely flushed at time of power loss.

As long as the number of dirty zones is less than N, there will be zero zone flushes during run time. However, in practice there may be more than N active zones (e.g., modified or dirty zones), or active zones change over time, which may require some zones to be flushed to zone band 152.

Because flushing LtoP zones to non-volatile memory 150 is only performed for the purpose of keeping the contents of the LtoP table 142 persistent, these writes to non-volatile memory 150 may be considered as algorithm overhead, and frequent zone flushes may reduce the write performance of the SSD 120. Thus, it may be desired to flush a higher number M of dirty zones to flash at every flush event. However, a large flush may itself cause an interruption in the SSD data write process, and so, a balance needs to be struck in order to lessen (e.g., minimize) the impact of LtoP zone flushes to non-volatile memory 150 on SSD write performance.

According to an embodiment, to further reduce (e.g., minimize) the number of zone flushes, the controller 130 flushes dirty zones that may be least likely to be used by the host 110 in the near term. Such zones may be the least recently used dirty zones, as indicated by the LRU list. Thus, when a number of dirty zones exceeds the threshold N, the controller 130 may flush the M least used dirty zones from the LRU list.

Further, as the number of zone flushes to non-volatile memory 150 is proportional to the host LBA write randomness, random writes will lead to more dirty zones and eventually more zone flushes to non-volatile memory 150. To lessen (e.g., minimize) the algorithm write overhead, in an embodiment of the present invention, zone size is reduced. Thus, less zone information will be flushed to the non-volatile memory 150 at each host random write. A zone may be as small as one LtoP entry per zone.

Therefore, by employing an LRU list and through appropriate selection of the number M of dirty zones to be flushed and the size of each LtoP zone, the FTL may be optimized (e.g., improved) to reduce system overhead caused by zone flushes.

Figure 2B:
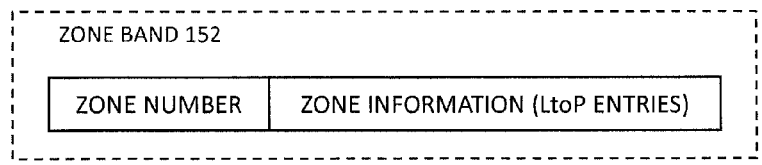
FIG. 2B illustrates a block diagram of a zone segment, in accordance with an illustrative embodiment of the present invention.

FIG. 2B illustrates a block diagram of a zone segment, in accordance with an illustrative embodiment of the present invention. An LtoP zone that is flushed to zone band 152 may be stored as a simple data structure called a zone segment. Each zone segment may include a header, which stores the zone number of the flushed zone, and a zone information field, which may include all of the entries stored in the flushed LtoP zone. Further, during a power off event, all remaining N dirty zones may be flushed to zone band 152 using the same data structure.

As more and more dirty zones are flushed to the zone band 152, the memory space allocated to the zone band 152 may fill up, preventing further zone segments from being written. To prevent (or minimize the chance of) the exhaustion of the zone band 152, the controller 130 may free up space by performing garbage collection on the zone segments, according to an embodiment of the present invention.

During the course of operation of the SSD 120 some LtoP zones may be flushed to the zone band 152 numerous times, thus, many zone segments having the same zone numbers may exist, with only the last (or the most recently flushed) of such zone segments containing valid (e.g., up-to-date) zone information. Therefore, all but the last of such zone segments are invalid (e.g., contain outdated information) and may be removed. Accordingly, in an embodiment of the present invention, the controller 130 may read the zone segments headers of a first block stripe of the zone band 152, and store the valid zone segments into a second block stripe of the zone band 152, while ignoring all duplicate (or invalid) zone segments. In one embodiment, the controller 130 may read the zone segments in an order opposite to the order in which they were written, and the first instance of a zone number appearing will represent the valid zone segment, and all subsequent zone segments with the same zone number may be ignored as invalid. For example, the controller 130 may keep track of which zones are being read for the first time using a bitmap. Once the valid zone segments are written onto the second block stripe, the first block stripe may be erased and reused for new zone segment writes. In an embodiment, in order to reduce (e.g., minimize) the garbage collection effort, zone band 152 is over provisioned 100%, that is, twice as many block stripes are allocated to the zone band 152 as would be necessary to back up the entire LtoP table.

As described above, prior to and during system power down, all zones of the LtoP table 142 are flushed to the zone band 152 of the non-volatile memory 150. At system power on, it is desired to quickly rebuild the LtoP table 142 in the volatile memory 140 based on the zone segments in the zone band 152.

According to one embodiment of the present invention, the controller 130 may read the zone segments in an order opposite to the order in which they were written into the zone band 152, extract the zone numbers from headers of the zone segments to determine whether or not a zone number has appeared before. The controller 130 may employ a bitmap to determine if each zone is being read for the first time. For example, after copying a zone segment to the LtoP table 142 in the non-volatile memory 140, the corresponding bit for that zone in the bitmap is set. For every zone that is read for the first time, the controller 130 transfers the zone information of that zone segment to the volatile memory 140 (e.g., DRAM) to rebuild the LtoP table 142.

The controller 130 copies the zone information of said zone segments in offset locations within the LtoP table 142 that correspond to the zone numbers of said zone segments. For example, this offset may be calculated by the equation:

$$\text{LtoP offset} = \text{zone\_number} \times \text{zone\_size} \quad (1)$$

Wherein zone_number represents the zone number of zone segment as indicated by its header and the zone_size represents the preset size of each of the LtoP zones (e.g., 1 KB, 4 KB, etc.). For purpose of simplification, equation 1 above assumes that the zone number allocated to the first LtoP zone in the LtoP table 142 is zero.

Figure 3:
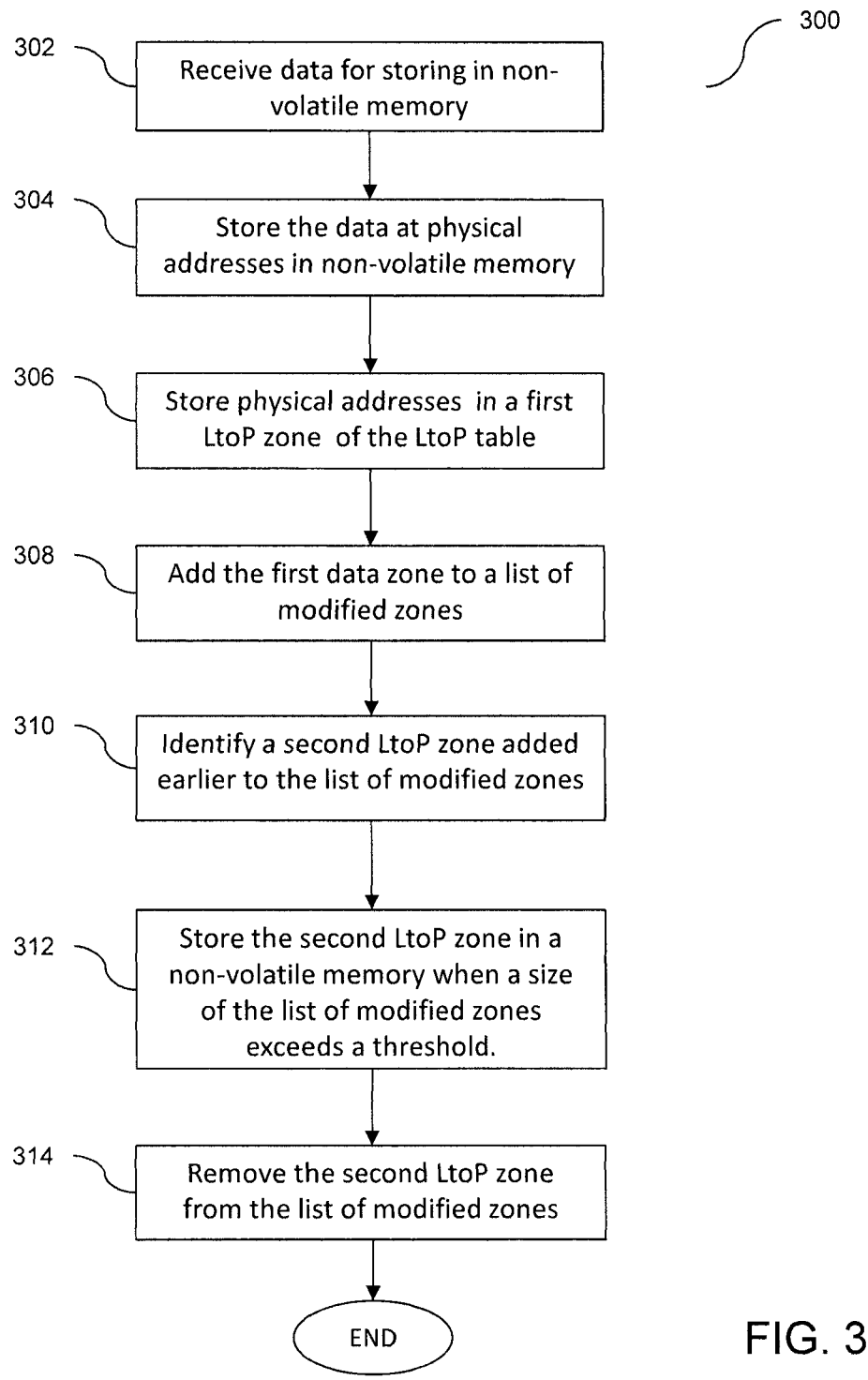
FIG. 3 is a flow diagram of a process for maintaining an LtoP table in the storage node, according to an illustrative embodiment of the present invention.

FIG. 3 is a flow diagram of a process 300 for maintaining an LtoP table 142 in the SSD 120, according to an illustrative embodiment of the present invention. At act 302, the controller 130 receives data from the host 110 for storing in the non-volatile memory 150. The data is associated with logical addresses of the host 110. At act 304, the controller 130 stores the data at physical addresses in the data band 154 of the volatile memory 150. At act 306, the controller 130 stores the physical address(es) in a first LtoP zone of the LtoP table 142, which is maintained in the volatile memory 140 (e.g., DRAM). According to an embodiment, the first LtoP zone may include one or more LtoP zones of the LtoP table 142. At act 308, the controller 130 labels the first LtoP zone as modified (e.g., dirty) and adds the zone to a list of modified zones (e.g., a list of dirty zones). At act 310, the controller 130 identifies an earlier modified LtoP zone (e.g., a second LtoP zone), which was added to the list of modified zones prior to the first LtoP zone. According to an embodiment, the earlier modified LtoP zone may include one or more LtoP zones of the LtoP table 142, and may represent the earliest modified LtoP zone(s). At act 312, the controller 130 stores (e.g., flushes) the earlier modified LtoP zone to the zone band 152 of the non-volatile memory 150 when a number of modified data zones (e.g., number of dirty zones) exceeds a threshold N, as described with respect to FIG. 2 above. At act 314, the controller 130 demarks the second LtoP zone as a modified zone (e.g., dirty zone) and removes the second LtoP zone from the list of modified zones.

Figure 4:
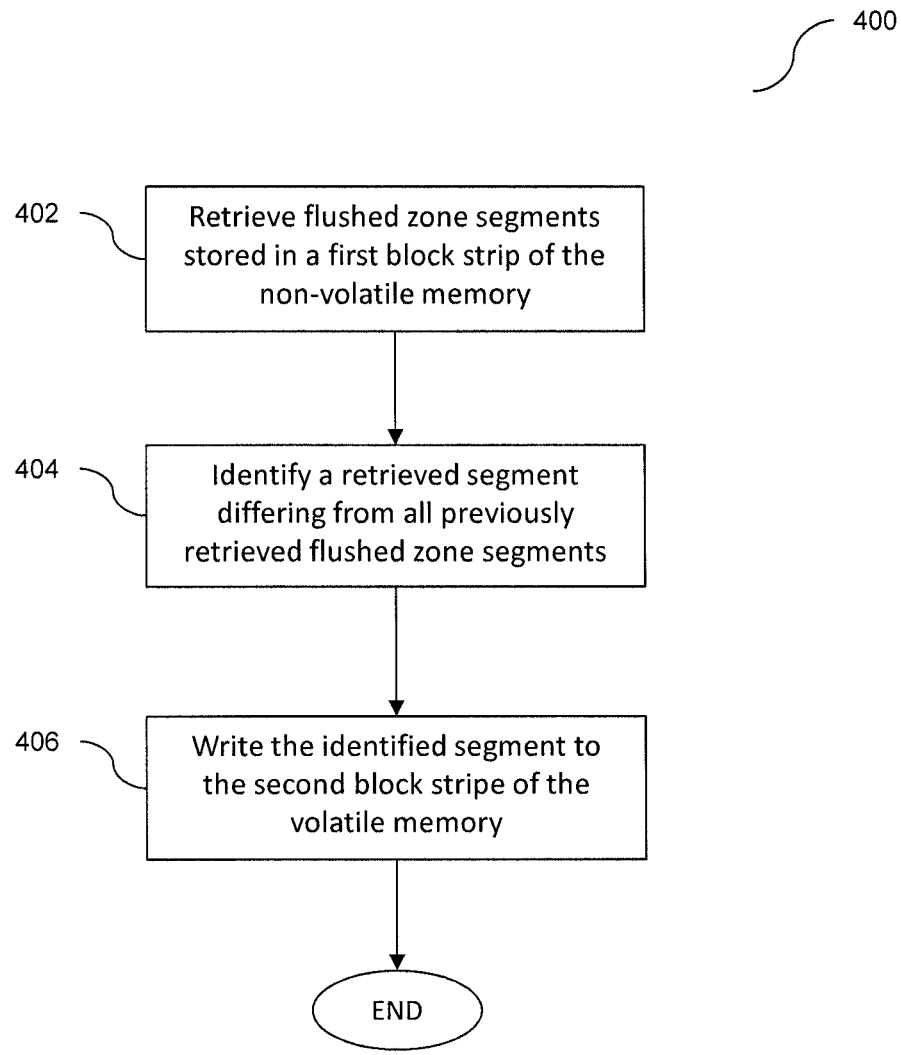
FIG. 4 is a flow diagram of a process for memory-efficient backup of an LtoP table in the storage node when there already exist zone segments that were previously flushed to a block stripe in zone band of the non-volatile memory, according to an illustrative embodiment of the present invention.

FIG. 4 is a flow diagram of a process 400 for memory-efficient backup of an LtoP table 142 in the SSD 120 when there already exist zone segments that were previously flushed (e.g., according to the process 300 described above with respect to FIG. 3) to a block stripe (e.g., a first block stripe) in the zone band 152 of the non-volatile memory 150, according to an illustrative embodiment of the present invention. At act 402, the controller 130 retrieves flushed zone segments stored in the first block stripe of the non-volatile memory 150 in an order opposite to an order of storage of the flushed zone segments in the first block stripe. At act 404, the controller 130 identifies retrieved zone segments that are different from (e.g., have different zone numbers from) all previously retrieved flushed zone segments. At act 406, the controller 130 writes said identified zone segments (e.g., the zone information included in each of the identified zone segments) to a second block stripe of the volatile memory 140.

According to an embodiment of the present invention, rather than apply to the entirety of the flushed zone segments, the sequence of acts described in acts 402-406 may be separately applied to each individual flushed zone of the flushed zone segments until every flushed zone of the flushed zone segments in the first block stripe has been processed.

Figure 5:
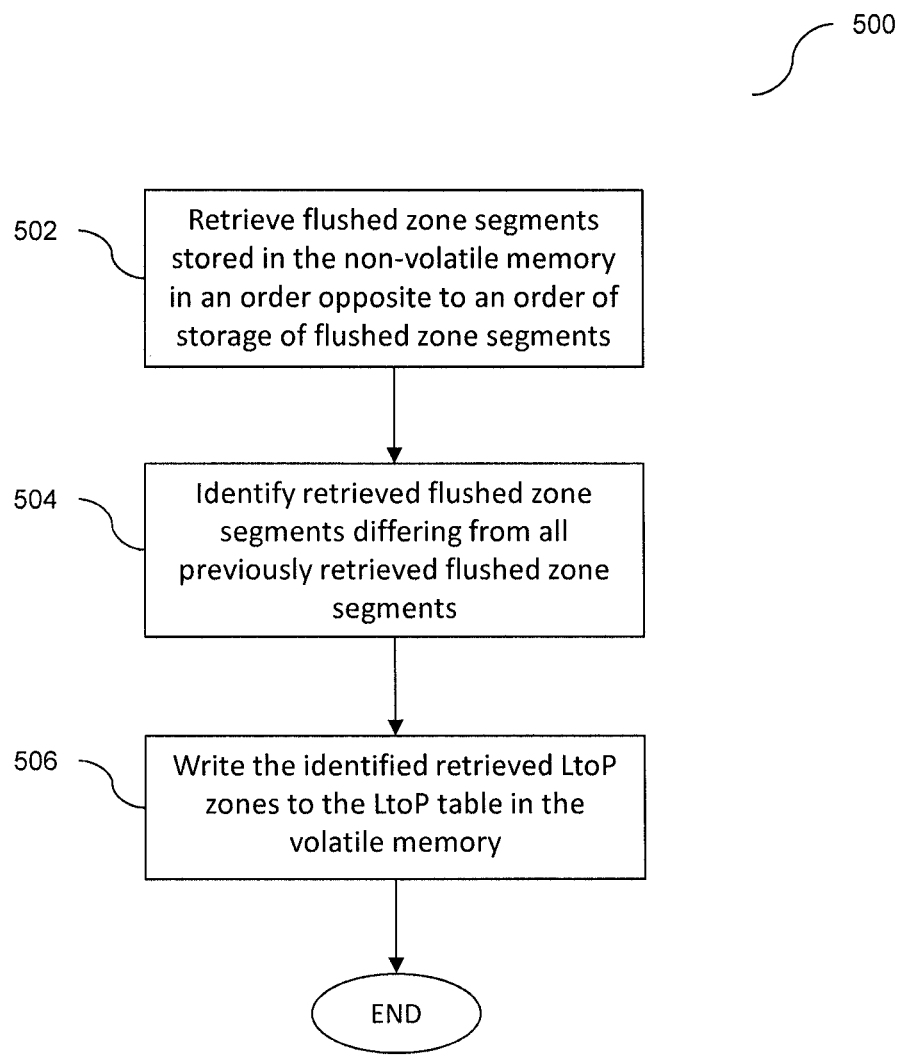
FIG. 5 is a flow diagram of a process for re-building an LtoP table in the storage node using zone segments previously flushed to the zone band of the non-volatile memory, according to an illustrative embodiment of the present invention.

FIG. 5 is a flow diagram of a process 500 for re-building an LtoP table 142 in the SSD 120 using zone segments previously flushed (e.g., according to the process 300 described above with respect to FIG. 3) to the zone band 152 of the non-volatile memory 150, according to an illustrative embodiment of the present invention. The following acts 502-506 may be performed during a system power on stage.

At act 502, the controller 130 retrieves flushed zone segments stored in the zone band 152 of the non-volatile memory 150 in an order opposite to an order of storage of the flushed zone segments in the zone band 152. At act 504, the controller 130 identifies retrieved zone segments that are different from (e.g., have different zone numbers from) all previously retrieved flushed zone segments. At act 506, the controller 130 writes said identified zone segments (e.g., the zone information included in each of the identified zone segments) to an LtoP table 142 in the volatile memory 140. Each identified zone segment may be stored at an offset within the LtoP table 142, which corresponds to the zone number associated with the identified zone segment and the size of each of the flushed zone segments.

According to an embodiment of the present invention, rather than apply to the entirety of the flushed zone segments, the sequence of acts described in acts 502-506 may be separately applied to each individual flushed zone of the flushed zone segments until every flushed zone of the flushed zone segments has been processed.

Figure 6:
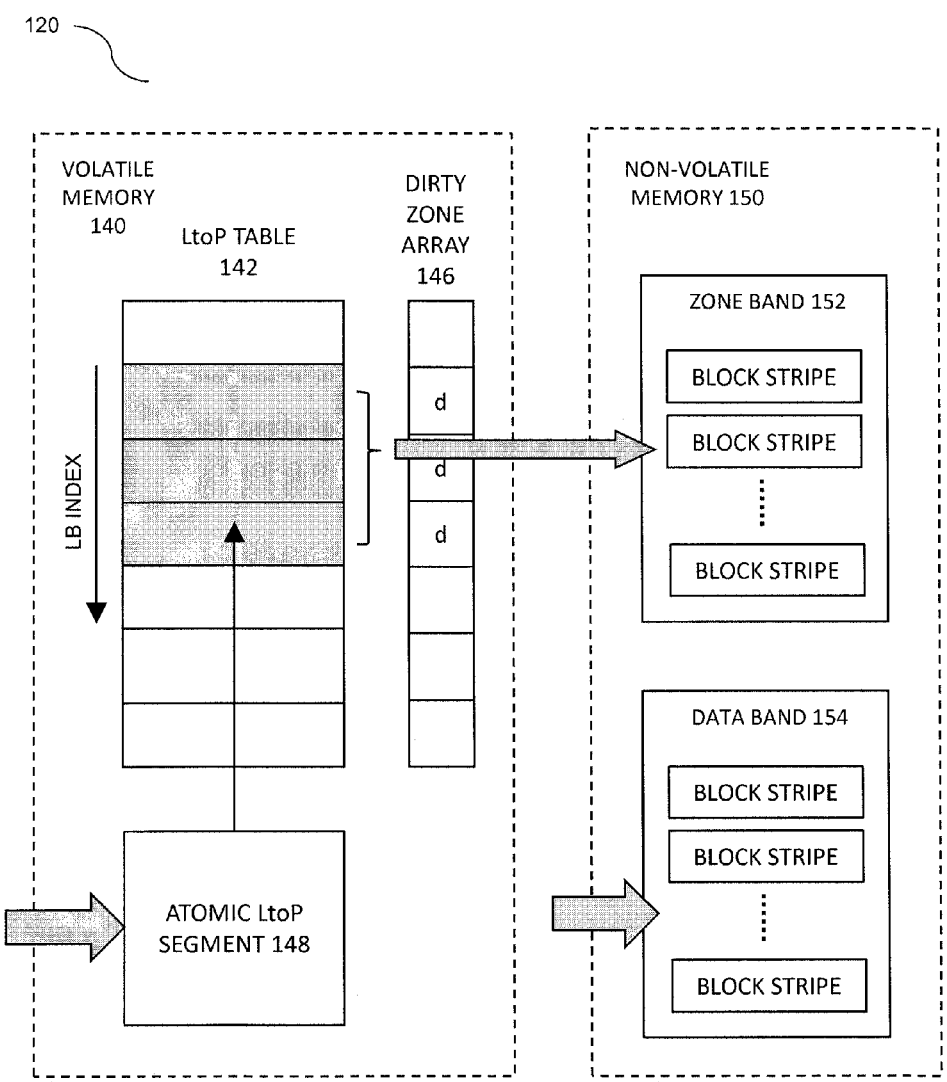
FIG. 6 illustrates a representation of an LtoP table and an atomic segment of a volatile memory and a non-volatile memory divided into separate block stripes grouped as zone band and data band, in relation with atomic write processes conducted on the storage node, in accordance with an illustrative embodiment of the present invention.

FIG. 6 illustrates a representation of an LtoP table 142 and an atomic segment 148 of a volatile memory 140 and a non-volatile memory 150 (e.g., flash memory) divided into separate block stripes grouped as zone band 152 and data band 154, in relation with atomic write processes conducted on the SSD 120, in accordance with an illustrative embodiment of the present invention.

According to an embodiment of the present invention, the SSD 120 is capable of supporting atomic writes from the host 110. In an atomic write, a single write command pertaining to a large data segment must be performed entirely or not at all. According to an embodiment, when executing an atomic write, the host 110 may write a large data segment (e.g., 1 MB or greater) to an internal buffer of the SSD 120. At this point, no acknowledgment may be made to the host 110 that the data has been stored. The controller 130 writes the buffered data segment to physical addresses in the data zones 154 of the non-volatile memory 150 and records the physical addresses as LtoP entries in an atomic LtoP segment 148 in the volatile memory 140. The LtoP entries represent a contiguous set of logical blocks in the non-volatile memory 150 starting from a specific logical block number. The starting logical block number is determined by the starting logical block number affected by the atomic write command to be performed. The size of the atomic LtoP segment 148 may be chosen to accommodate all of the physical addresses associated with a single write of a large data segment.

Upon completion of the atomic write, the controller 130 determines the number of LtoP zones that would be dirtied by copying the LtoP entries of the atomic LtoP segment 148 to the LtoP table 142. If the new count of dirty LtoP zones exceeds the maximum allowed count (e.g., a threshold N, as described above with respect to FIG. 2), the excess numbers of dirty zones will be flushed to zone band 152 to free up room for the new dirty zones due to the atomic write. The flushing of excess dirty zones may be performed according to the processes 300 and 400 described above with respect to FIGS. 3 and 4. In an atomic way, all the recorded changes in atomic LtoP segment 148 are applied to the LtoP table 142 and the affected zones are marked as dirty (e.g., as described above with respect to FIG. 2). The new dirty LtoP zones may be added to a dirty zone list (e.g., the LRU list). The controller 130 then acknowledges to the host 110 that the write to the SSD 120 has been completed.

Therefore, if a power failure occurs as the controller 130 is writing the large data segment ("new data") in the non-volatile memory 150 and as the entries in the atomic LtoP segment 148 are being updated, the LtoP table 142 only points to "old data" (e.g., data stored before the present atomic write command) and will be flushed as such. As a result, when the LtoP table 142 is re-built during a subsequent power-on, the rebuilt LtoP table 142 will also point only to old data. Further, as no write-completion acknowledgment is sent to the host 110 before the power loss, the host 110 does not expect to later read the new data from the SSD 120. In other words, in the event of power failure during a write process, the SSD 120 is capable of preserving old data and is, thus, capable of performing a true atomic write.

Figure 7:
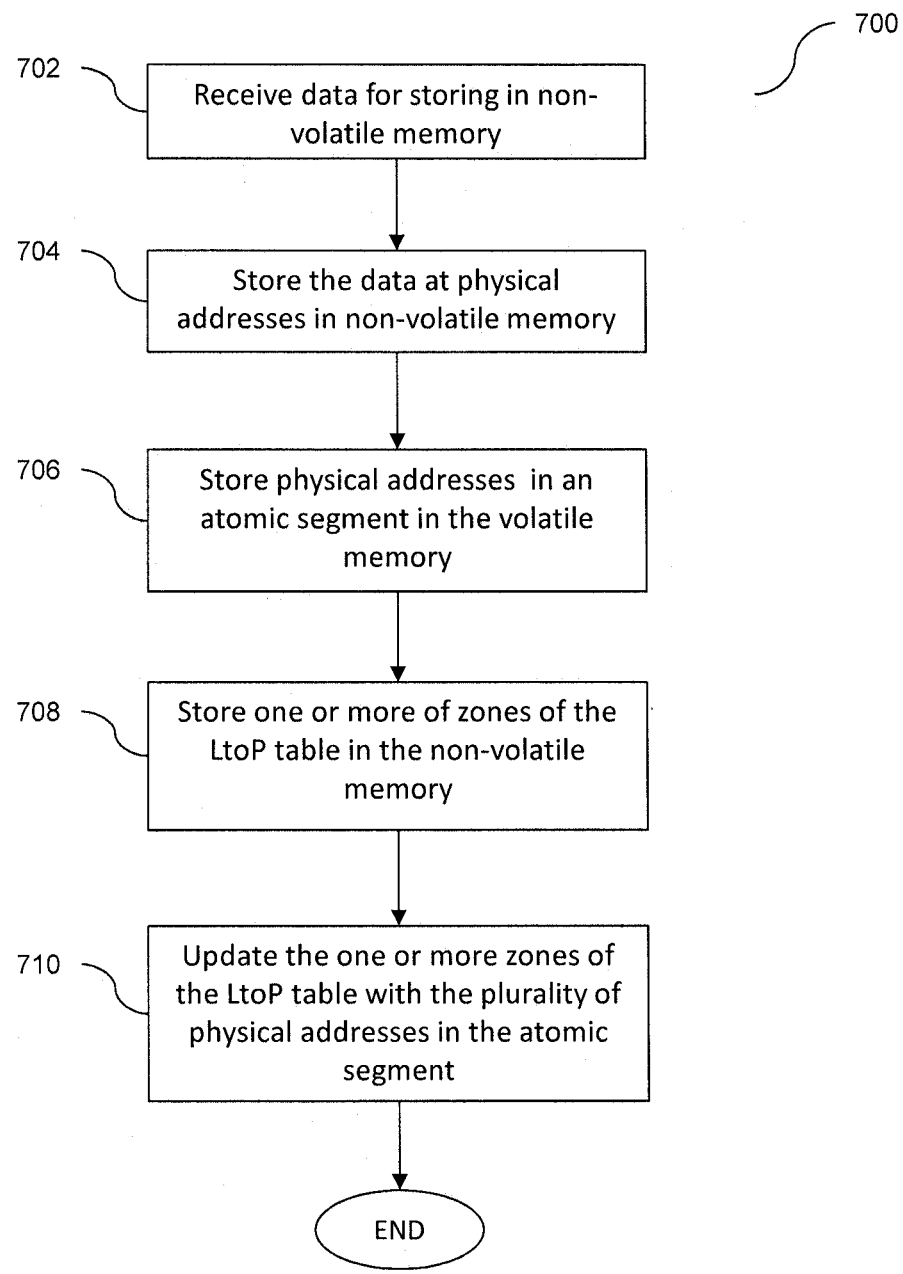
FIG. 7 is a flow diagram of a process for maintaining and updating an LtoP table in the storage node during an atomic write operation to the data band of the non-volatile memory, according to an illustrative embodiment of the present invention.

FIG. 7 is a flow diagram of a process 700 for maintaining and updating an LtoP table 142 in the SSD 120 during an atomic write operation to the data band 154 of the non-volatile memory 150, according to an illustrative embodiment of the present invention.

At act 702, the controller 130 receives data from the host 110 for storing at physical addresses in the non-volatile memory 150. The received data is associated with the logical addresses of the host 110. At act 704, the controller 130 stores the data at the physical addresses in the data band 154 of the non-volatile memory 150. At act 706, the controller 130 stores the physical addresses in an atomic LtoP segment 148 in the volatile memory 140. At act 708, the controller 130 stores one or more of zones (e.g., one or more dirty zones) of the LtoP table 142 in the non-volatile memory 150. The plurality of zones of the LtoP table 142 may correspond in size to the atomic LtoP segment 148, and may represent the least recently used dirty zones of the LtoP table 142. At act 710, the controller 130 updates the plurality of zones of the LtoP table 142 with the physical addresses in the atomic LtoP segment 148.

Other embodiments are within the scope and spirit of the present invention. For example, the functionality described above can be implemented using software, hardware, firmware, hardwiring, or combinations thereof. One or more computer processors operating in accordance with instructions may implement the LtoP table related functions in accordance with the present invention as described above. It is within the scope of the present invention that such instructions may be stored on one or more non-transitory processor readable storage media (e.g., a magnetic disk, non-volatile random-access memory, phase-change memory or other storage medium). Additionally, modules implementing functions may also be physically located at various positions, including being distributed such that portions of functions are implemented at different physical locations.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the present invention. Further, although the present invention has been described herein in the context of a particular implementation in a particular environment for a particular purpose, those of ordinary skill in the art will recognize that its usefulness is not limited thereto and that the present invention may be beneficially implemented in any number of environments for any number of purposes. Accordingly, the claims set forth below should be construed in view of the full breadth and spirit of the present invention as described herein and equivalents thereof.

What is claimed is:

1. A method of maintaining and updating a logical-to-physical (LtoP) table in a storage device comprising a processor, a volatile memory, and a non-volatile memory, the storage device being in communication with a host, the method comprising:
  receiving, by the processor, data for storing at a physical address in the non-volatile memory, the data being associated with a logical address of the host;
  storing, by the processor, the physical address in a first LtoP zone of a plurality of LtoP zones of the LtoP table, the LtoP table being stored in the volatile memory;
  adding, by the processor, the first LtoP zone to a list of modified zones when one or more physical addresses in the first LtoP zone are modified due to a logical block write; and
  storing, by the processor, a second LtoP zone of the plurality of LtoP zones in the non-volatile memory when a size of the list of modified zones exceeds a threshold.

2. The method of claim 1, wherein at least one physical address is stored in each LtoP zone of the plurality of LtoP zones.

3. The method of claim 1, further comprising:
  after the receiving of the data, storing, by the processor, the data at the physical address in the non-volatile memory.

4. The method of claim 1, further comprising:
  after the storing of the second LtoP zone, removing the second LtoP zone from the list of modified zones,
  wherein the second zone was earlier added to the list of modified zones.

5. The method of claim 1, wherein the storing of the second LtoP zone in the non-volatile memory comprises storing the second LtoP zone in a data structure comprising a zone number and a zone information.

6. The method of claim 1, wherein the size of the list of modified zones is equal to a number of LtoP zones of the plurality of LtoP zones added to the list of modified zones.

7. The method of claim 1, wherein zones of the plurality of LtoP zones are contiguous and sequential.

8. The method of claim 1, wherein each LtoP zone of the plurality of LtoP zones is 4 KB in size.

9. A storage device configured to maintain and update a logical-to-physical (LtoP) table resilient to power cycles, and in communication with a host, the storage device comprising:
  a processor; and
  a memory comprising a volatile memory and a non-volatile memory, wherein the memory has stored thereon instructions that, when executed by the processor, cause the processor to perform:
    receiving data for storing at a physical address in the non-volatile memory, the data being associated with a logical address of the host;
    storing the physical address in a first LtoP zone of a plurality of LtoP zones of the LtoP table, the LtoP table being stored in the volatile memory;
    adding the first LtoP zone to a list of modified zones when one or more physical addresses in the first LtoP zone are modified due to a logical block write; and
    storing a second LtoP zone of the plurality of LtoP zones in the non-volatile memory when a size of the list of modified zones exceeds a threshold.

10. The storage device of claim 9, wherein at least one physical address is stored in each LtoP zone of the plurality of LtoP zones.

11. The storage device of claim 9, wherein the executed instructions further cause the processor to perform:
 after the storing of the second LtoP zone, removing the second LtoP zone from the list of modified zones,
 wherein the second zone was earlier added to the list of modified zones.

12. The storage device of claim 9, wherein the storing of the second LtoP zone in the non-volatile memory comprises storing the second LtoP zone in a data structure comprising a zone number and a zone information.

* * * * *